(12) United States Patent
Fly et al.

(10) Patent No.: US 11,655,102 B2
(45) Date of Patent: May 23, 2023

(54) AUTOMATED TOOL CONTROL DEVICE MANAGED IN A TOOL CRIB MANAGEMENT SYSTEM

(71) Applicant: SNAP-ON INCORPORATED, Kenosha, WI (US)

(72) Inventors: David C. Fly, Maumelle, AR (US); Matthew J. Lipsey, Sherwood, AR (US); Preston C. Phillips, Conway, AR (US); Jason Newport, Conway, AR (US); Andrew R. Lobo, Wadsworth, IL (US); Joseph Chwan, Mechanicsburg, PA (US); Frederick J. Rogers, North Little Rock, AR (US); Sean W. Ryan, Pleasant Prairie, WI (US)

(73) Assignee: Snap-On Incorporated, Kenosha, WI (US)

( * ) Notice: Subject to any disclaimer, the term of this patent is extended or adjusted under 35 U.S.C. 154(b) by 245 days.

(21) Appl. No.: 16/915,870

(22) Filed: Jun. 29, 2020

(65) Prior Publication Data
US 2020/0407162 A1     Dec. 31, 2020

Related U.S. Application Data

(60) Provisional application No. 62/868,698, filed on Jun. 28, 2019.

(51) Int. Cl.
*B65G 1/137* (2006.01)
(52) U.S. Cl.
CPC .................................. *B65G 1/1371* (2013.01)
(58) Field of Classification Search
CPC ... B65G 1/1371; G06Q 10/08; G07C 9/00912
(Continued)

(56) References Cited

U.S. PATENT DOCUMENTS 6,166,688 A      12/2000 Cromer
10,192,197 B2 *   1/2019 Rogers ................ G06Q 10/087
(Continued)

FOREIGN PATENT DOCUMENTS

WO     2010-017533 A2    2/2010
WO     2017-141164 A1    8/2017

OTHER PUBLICATIONS

European Patent Searching Authority—International Search Report and Written Opinion dated Sep. 18, 2020 for related International Patent Application No. PCT/US2020/040131, 10 pgs.
(Continued)

*Primary Examiner* — Ahshik Kim
(74) *Attorney, Agent, or Firm* — McDermott Will & Emery LLP

(57) ABSTRACT

The present application describes an automated inventory control system that comprises a storage device, a sensing system, a data storage, and one or more processors. The storage device includes a plurality of storage locations for storing objects. The sensing system is configured to associate the storage device with a first location and with a second location. The data storage is configured to store configurable data of the storage device. The one or more processors are configured to send configurable data corresponding to the first location to the storage device in response to receiving information associating the storage device with the first location from the sensing system. In response to receiving information associating the storage device with the second location from the sensing system, the one or more processors are configured to send configurable data corresponding to the second location to the storage device.

17 Claims, 3 Drawing Sheets

(58) Field of Classification Search
USPC .......................................................... 700/214
See application file for complete search history.

(56) References Cited

U.S. PATENT DOCUMENTS

| | | | |
|---|---|---|---|
| 10,504,058 B2* | 12/2019 | Uno | G06K 7/10297 |
| 2010/0252626 A1* | 10/2010 | Elizondo | G06Q 10/087 |
| | | | 340/10.51 |
| 2015/0039477 A1 | 2/2015 | O'Neil | |
| 2020/0410434 A1* | 12/2020 | Fly | B25H 3/028 |

OTHER PUBLICATIONS

European Patent Searching Authority—International Preliminary Report on Patentability dated Jan. 6, 2022 for related International Patent Application No. PCT/US2020/040131, 7 pgs.

* cited by examiner

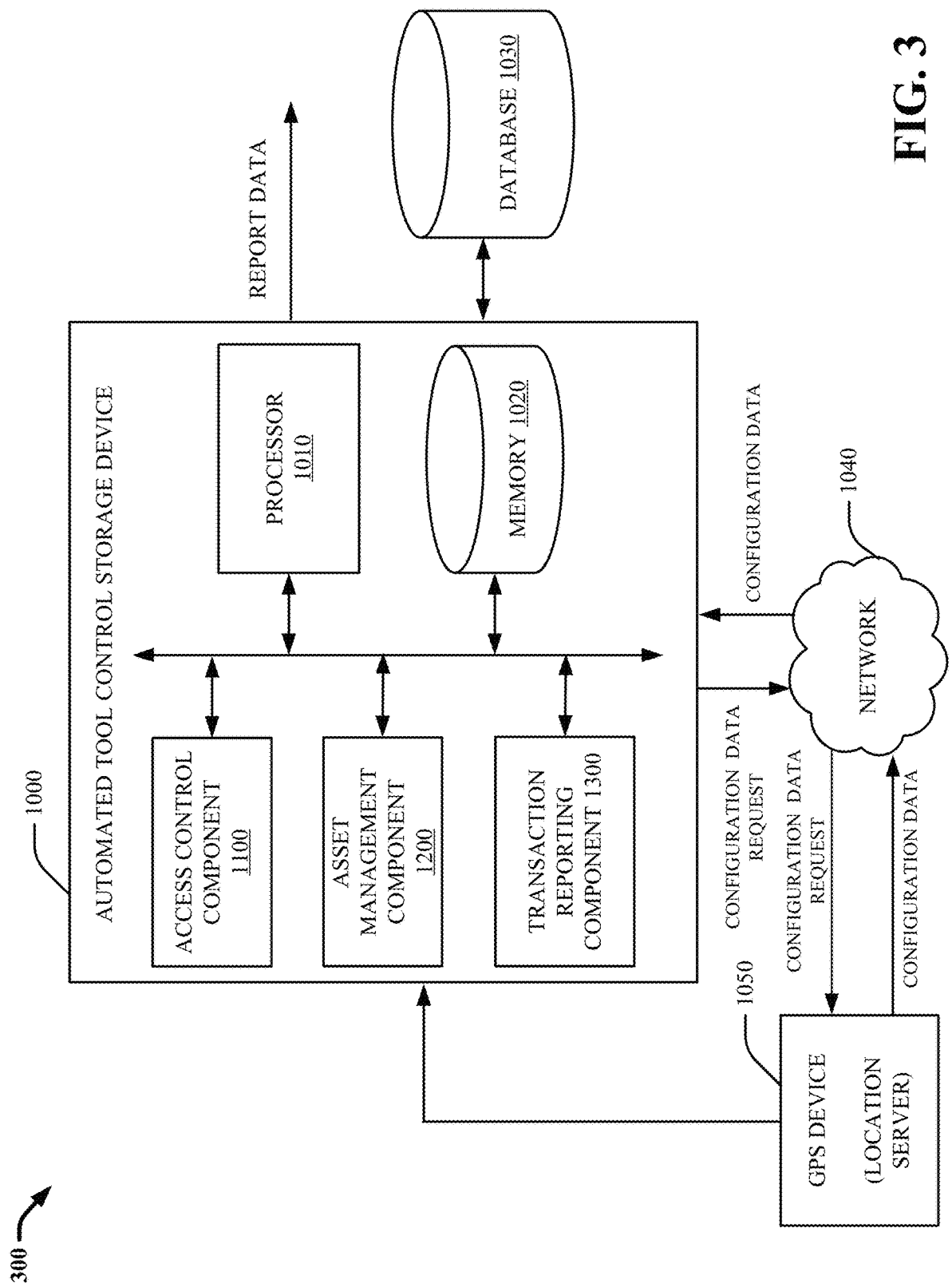

AUTOMATED TOOL CONTROL DEVICE MANAGED IN A TOOL CRIB MANAGEMENT SYSTEM

CROSS-REFERENCE TO RELATED APPLICATION

This application claims the benefit of U.S. Provisional Application No. 62/868,698, filed on Jun. 28, 2019, in the U.S. Patent and Trademark Office, the disclosure of which is incorporated by reference herein in its entirety.

TECHNICAL FIELD

The present subject matter relates to automated tool control systems and techniques and equipment to monitor the geographical location and configuration of tool control devices in an automated tool control system.

BACKGROUND

Modern automated tool control systems are often used with a computerized network system comprised of a wired and/or wireless network, a primary database, a network service, an administrative client software application, and a variety of tool control devices. In many cases, various tool control devices are connected to the network and are capable of transferring and receiving data through the network service to and from the primary database. Automated tool control devices include automated tool control storage devices that are capable of physically storing objects and data entry devices that are only capable of recording, transmitting and receiving data. Typically, the data entry devices are not capable of physically storing objects. The automated tool control storage devices include, but are not limited to, automated toolboxes, lockers, tool crib management systems, vending equipment, unmanned tool cribs, inventory scale systems, etc.

One of the problems related with the automated tool control storage devices is that various aspects of such tool control storage devices must be configured prior to their use. Examples of such configurable aspects and procedures include work locations, authorized users, authorized user access rights, languages, user groups, and user group access rights. Configurable aspects and procedures additionally include notifications and/or alerts, more specifically, recipients, types, and/or delivery methods related with such notifications/alerts. Other configurable aspects and procedures include reports, particularly, related with report recipients, report type, and/or report delivery options. In some cases, such configurable aspects and procedures may also include audit types, scheduling, and the like. In addition, typical configurations for such automated tool control storage devices are manually performed and, in many cases, pre-set to the default configurations. Moreover, those configurations must be manually modified if the automated tool storage device are to be moved from one work group and/or location to another work group and/or location, which require different configurations. This process is inefficient and time consuming.

In view of foregoing shortcomings, there is a need for an improved system and method that enables the tool control storage devices to be automatically configured for any aspects and procedures that respond to such changes in the work group and/or location. Such an improved system and method may also send an alert and/or notifications to the users.

BRIEF DESCRIPTION OF THE DRAWINGS

Operation of the invention may be better understood by reference to the detailed description taken in connection with the following illustrations. These appended drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the invention as if fully rewritten herein.

FIG. 3 illustrates a block diagram of an exemplary automated tool control storage device in accordance with various described embodiments.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various methods and systems disclosed herein relate to the automated tool control device within the inventory of an automated tool control tool crib management system.

Figure 1:
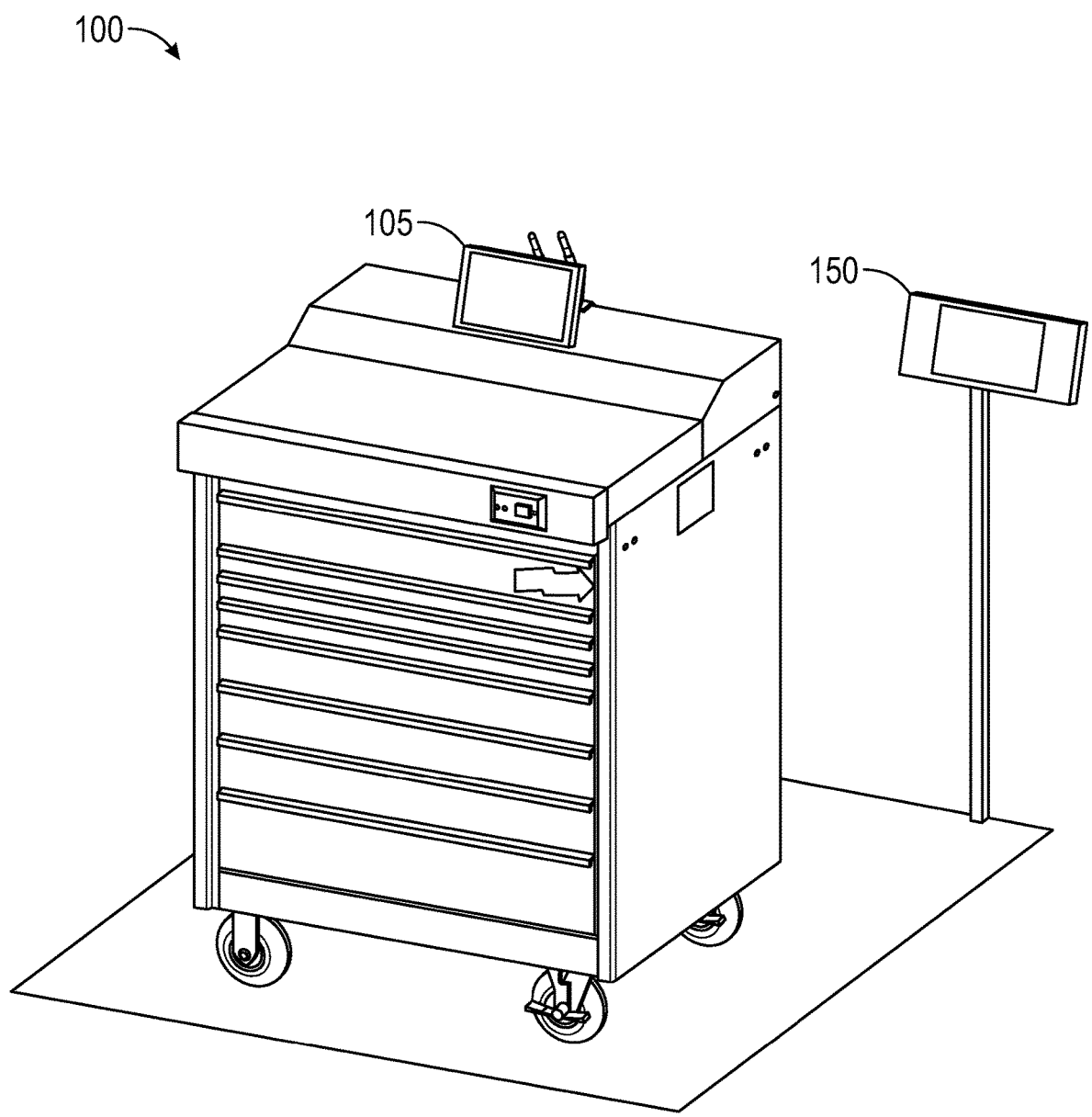
FIG. 1 illustrates a high-level schematic diagram of an exemplary automated tool control system in accordance with various described embodiments.

FIG. 1 shows an automated tool control system 100 in the form of a tool crib management system 105. While the tool crib management system 105 shown in FIG. 1 is a toolbox, the tool crib management system 105 may more generally be tool lockers or any other secure storage devices or enclosed secure storage areas (e.g., a tool crib or walk-in tool locker).

Each tool crib management system 105 is a highly automated inventory control system that utilizes multiple different sensing technologies for identifying inventory conditions of objects in the storage unit. In one example, the tool crib management system 105 uses machine imaging and RF sensing methodologies for identifying inventory conditions of objects in the storage unit.

Illustrative features of the tool crib management system 105 of the disclosure include the ability to process complex image data with efficient utilization of system resources, autonomous image and camera calibrations, identification of characteristics of tools from image data, adaptive timing for capturing inventory images, efficient generation of reference data for checking inventory status, and autonomous compensation of image quality, etc. Further features include the ability to emit and receive RF sensing signals, such as RF identification (RFID) signals, to process the received signals to identify particular tools, and to cross-reference tool information obtained through the multiple different sensing modalities (e.g., camera and RFID based modalities).

The tool crib management system 105 utilizes one or more of various sensing technologies 150 to determine issue/return or presence/absence of objects from its storage.

For example, the issue/return or presence/absence of objects can be sensed using one or more of imaging-based sensing technology (e.g., using cameras), RFID-based sensing technology, wireless sensors including Bluetooth sensors, individual switches or sensors (e.g., contact, capacitive, inductive, weight, or other sensors), such as sensing technologies used in automated tool control imaging toolboxes and/or automated tool control RFID lockers. Unique identifiers, such as machine readable bar codes, color coded tags, RFID tags, etc., can be attached to inventory objects or tools stored in the storage container of the automated tool control system 100 and used to uniquely identify items (e.g., so as to distinguish between two items that are otherwise undistinguishable to the system's sensing technology, such as two visually identical tools being sensed using an imaging system). In some embodiments, one or more processors are configured to determine a location of the inventory objects or tools based on triangulation of three or more sensors including the Bluetooth sensor. For example, time of arrival (ToA) or time of flight (ToF) may be used to calculate the distance of the inventory objects or tools from each of the three or more sensors, and to determine the location of the inventory objects or tools. The three or more sensors may be determined to maximize the strength of the signals received or detected by the three or more sensors. In some cases, triangulation may be used with RFID based modalities (e.g., RFID triangulation).

Figure 2:
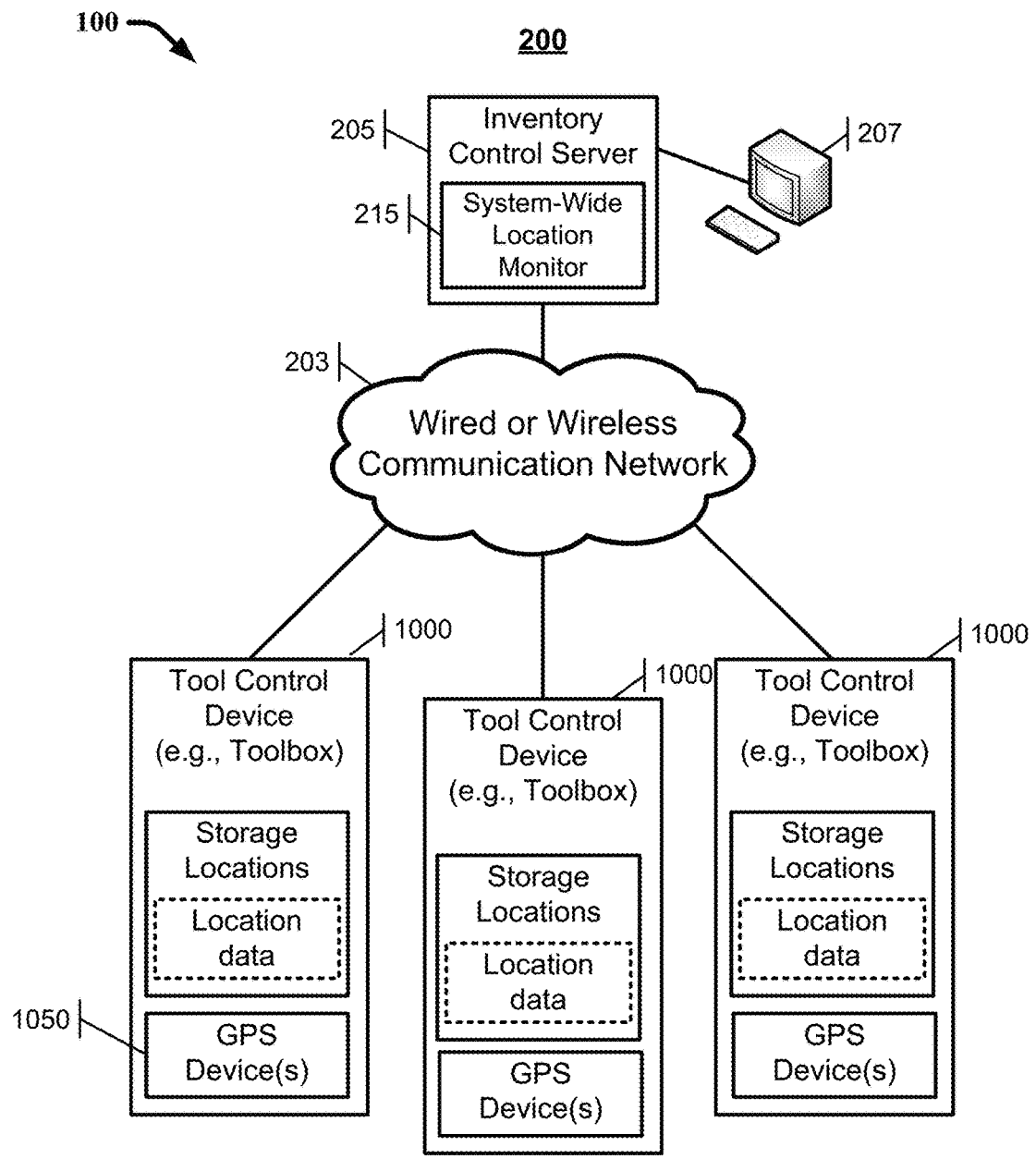
FIG. 2 illustrates a high-level functional block diagram of an exemplary networked automated tool control system including multiple automated tool control devices communicatively connected to each other in accordance with the tool control systems described herein.

FIG. 2 illustrates an exemplary automated tool control system 100 that may also comprise a networked tool control system 200 including multiple tool control devices 1000. For example, the networked tool control system 200 can include a plurality of automated tool control storage devices 1000 which each may be similar to the tool control system 100 so as to each include storage locations, sensing devices, and one or more battery chargers therein. The automated tool control storage devices 1000 may be communicatively connected to each other and/or to an inventory control server 205 via a wired or wireless communication network 203. A system administrator terminal 207 may be connected to the server 205 to enable a system administrator to manage the system as needed and receive alerts from the system. In this manner, the processor and memory storing executable program instructions of any individual tool control device 201 can be connected to the computer network (e.g., 203) and exchange data with an administrative software application running on the server 205 and used to manipulate and store data and store and display information relative to the data to system users. The administrative software application running on the server 205 can include a system wide location monitor (not shown).

FIG. 3 illustrates a block diagram of an exemplary tool crib management system 105 in accordance with one or more embodiments described herein. The tool crib management system 105 includes an automated tool control storage device 1000. In the embodiment shown in FIG. 3, the automated tool control storage device 1000 can include an access control component 1100, an asset management component 1200, and a transaction reporting component 1300. In certain embodiments, the asset management component 1200 can include an artificial intelligence component.

The automated tool control storage device 1000 may include, but is not limited to, automated toolboxes, lockers, vending equipment, unmanned tool cribs, inventory scale systems, etc. These devices can be secured by various electronically-controlled locking mechanisms and may be used with various authentication means such as, for example, a proximity card reader, a biometrics device, and/or the like, to verify authorized personnel and allow such access. The automated tool control storage device 1000 can issue objects from inventory, return objects to inventory, and record the details of the transactions, including user log in and logoff, transaction time and date, and tool status.

The automated tool control storage device 1000 is capable of managing the issue and return of objects utilizing any of various sensing technologies. These devices are equipped with a processor, a memory, a local database, and software codes used to interpret the sensor data and to determine the current status of objects managed by the device. These devices may communicate with the networked service via wired or wireless networks and can transmit and receive the object related data.

The access control component 1100 may work in concert with at least one electronically controlled locking mechanism for securely locking the drawers and doors of any cabinets. The access control component 1100, such as a card reader, along with a processor 1010 and a memory 1020 storing executable program instructions, electronically identifies a user requesting access to the tool crib management server 112, determines an authorization level for the user, and selectively provides access to the secure area of the automated tool control storage device 1000 based on the determined authorization level. The processor 1010 and the memory 1020 storing executable program instructions operatively identify predetermined authorized access levels to the tool crib management server 112 and allow or deny physical access by the user to the automated tool control storage device 1000 based on those predetermined authorized levels of access. The access control component 1100, configured to identify the user requesting access, may also use any of the following technologies, individually or in combination but not limited to: RFID proximity sensors with cards; magnetic strip (magstripe) cards and scanners; barcode cards and scanners; common access cards and readers; biometric sensor ID systems, such as facial recognition; fingerprint recognition; handwriting analysis; iris recognition; retinal scan; vein matching; voice analysis; and/or multimodal biometric systems.

The automated tool control storage device 1000 is also equipped with at least one electronically controlled locking mechanism, along with the processor 1010 and machine readable instructions configured to electronically identify a user requesting access to the secure area or object storage device. The processor 1010 may further be configured to identify predetermined authorized access levels to the system and allow or deny physical access by a user to a three dimensional space, object storage and control device based on those predetermined authorized levels of access.

As shown in FIG. 3, the automated tool control storage device 1000 includes an asset management component 1200. The asset management component 1200 is configured to manage an issuance and return of the objects using any of various sensing technologies. The automated tool control storage device 1000 may be equipped with the processor 1010 and the memory 1020, a database 1030 and software code used to interpret the sensor data and to determine the current status of the objects managed by the device. The automated tool control storage device 1000 communicates with the networked service via wired or wireless networks 1040 and can transmit and receive the object related data.

In some embodiments, the asset management component 1200 may further perform an analysis of the issued or returned objects in connection with access control of the work locations. The asset management component 1200 can analyze whether the issued objects of a certain transaction are checked against the returned list. The asset management component 1200 can further determine availability and schedule maintenance or calibration services.

The automated tool control storage device 1000 is configured to automatically set to the default crib configurations by the system software when the automated tool control storage device 1000 is loaded into the automated tool control system 100 and assigned to a tool crib (not shown) in the tool crib management system 105.

In some embodiments, the automated tool control storage device 1000 updates the configurable data in communication with the tool crib based on revised system or work location requirements. When the automated tool control storage device 1000 is electronically issued to a work location, the system software identifies a transaction and automatically configures the device to a pre-stored system and user configurations specific for that location. In some embodiments, the automated tool control storage device 1000 is configured to coordinate with a GPS device 1050 shown in FIG. 2 and the tool crib. The access control component 1100 of the automated tool control storage device 1000 is configured to update the configurable data and procedures based on a changed work order related with the work location.

When the automated tool control storage device 1000 is electronically returned to the tool crib location, the system software identifies the transaction and automatically reconfigures the device to the stored system and user configurations specific for the tool crib.

In some embodiments of this disclosure, the automated tool control storage device 1000 can be transferred to a first location, then transferred to a second location without being returned to the first location. In such case, the default configurations are changed by the system from the first location's default settings to the second location's default settings. In accordance with some aspects of this disclosure, the automated tool control storage device 1000 may include various methods to update the configuration data. In one embodiment, the automated tool control storage device 1000 may be configured to include the entirety of configuration data (e.g., settings and/or users) for each of the various locations within the database 1030. The data for each of the objects, tools, and other inventory items may be pre-stored in the database 1030 and/or preloaded into the memory 1020 of the automated tool control storage device 1000. The objects, tools and other inventory items are notified by the system and/or network where the tools, objects and other inventory items are assigned to and update only appropriate system and user configurations from the memory 1020. In such an embodiment, when the work location is entered as the objects, tools, and other inventory items are issued from the tool crib and/or the tool crib management system 105, the automated tool control storage device 1000 automatically updates the configuration issued to the location.

In the automated tool control storage device 1000, changing or moving an automated tool control device's location may not necessarily involve physical movement and may instead relate to the circumstance in which it is used or a relationship to an element or feature. For example, an automated tool control storage device 1000 may be assigned to a location of "landing gear," which may later change to a location of "wing structure repair" even if the automated tool control storage device 1000 does not change its physical location in space.

In another embodiment, the automated tool control storage device 1000 may be configured to recognize each location by the GPS device 1050 (or the location server). The appropriate system and user configurations may be transferred and assigned to the device for each of the various locations. The GPS device 1050 (or the location server) may receive a configuration data request generated by the automated tool control storage device 1000 via the network 1040. The GPS device 1050 can generate the configuration data in response to a configuration data request and send the configuration data to the automated tool control storage device 1000 also via network 1040. In such an embodiment, the GPS device 1050 communicatively connected to the tool crib management system 105 determines the location and automatically updates when the location is determined.

In some embodiments, a particular job may require specific tools. The automated tool control storage device 1000 can display in the user interface 105 shown in FIG. 1 with the configurable data that indicates only the tool or objects to be used to fulfill job and/or work location requirements. The access control component 1100, the asset management component 1200, and configuration component 1400 of the automated tool control storage device 1000 can coordinate with the database 1030 to adjust the current or anticipated tools that satisfy job and/or work location requirements, and accordingly change the access control mode as the needs of the automated tool control storage device 1000 change.

The automated tool control storage device 1000 may record and store a transactions record of every event in each of the various locations. The status and condition of the device may be included in the status and condition of the location to which it is issued. In some embodiments, while the device is in a location, it can automatically inherit any changes that occur in the location status, configuration, alert and notifications, and other aspects.

The automated tool control storage device 1000 may be configured to initiate an audit and other pre-defined processes when changes in location are implemented. In some embodiments, the automated tool control storage device 1000 may be configured to initiate the audit with respect to administration application dashboard displays, notifications, alerts, and reports concerning the issued location. The audit may further include any specific instructions, work related conditions, job-related data, and/or events.

The invention claimed is:

1. An inventory control system comprising:
a storage device including a plurality of storage locations for storing objects;
a sensing system configured to associate the storage device with a first location and with a second location;
a data storage configured to store configurable data of the storage device, wherein the sensing system includes:
a first network communication device capable of communicating with the storage device and corresponding to the first location, and
a second network communication device capable of communicating with the storage device and corresponding to the second location; and
one or more processors communicatively coupled to the storage device and the sensing system, the one or more processors configured to:
in response to receiving information associating the storage device with the first location from the sensing system, send configurable data corresponding to the first location to the storage device; and
in response to receiving information associating the storage device with the second location from the sensing system, send configurable data corresponding to the second location to the storage device.

2. The inventory control system of claim 1, wherein the sensing system includes one or more GPS devices of the storage device.

3. The inventory control system of claim 1, wherein the sensing system includes:
  a first sensing system corresponding to the first location and configured to detect presence of the storage device at the first location, the first sensing system comprising one or more of: an RFID sensor, a wireless sensor including a Bluetooth sensor, a camera, a contact sensor, an electromagnetic sensor, or a weight sensor; and
  an access control device configured to receive information corresponding to a user of the storage device and associate the storage device with the second location based on the information corresponding with the user.

4. The inventory control system of claim 3, wherein the one or more processors are configured to determine a location based on a triangulation using the Bluetooth sensor.

5. The inventory control system of claim 3, wherein the second location is a work location from a work order assigned to the user, and wherein the configurable data corresponding to the second location includes a list of stored objects in the storage device associated with the second location.

6. The inventory control system of claim 1, wherein the processor is further configured to:
  maintain a location status for the storage device;
  receive information indicating a change to data corresponding to the first location; and
  if the location status for the storage device indicates the storage device is at the first location, send configurable data corresponding to the changed data at the first location to the storage device.

7. The inventory control system of claim 1, wherein the storage device is configured to generate transaction records of events at the first and second locations.

8. The inventory control system of claim 1, wherein the one or more processors are configured to initiate an audit for the storage device in response to receiving information associating the storage device with the first location from the sensing system.

9. The inventory control system of claim 6, further comprising a user interface configured to display the configurable data corresponding to the second location.

10. A method for an inventory control system, comprising the steps of:
  storing a plurality of objects in storage locations of a storage device;
  storing, with a data storage, configurable data of the storage device;
  associating, with a sensing system, the storage device with a first location;
  in response to associating the storage device with the first location, sending configurable data corresponding to the first location to the storage device;
  after sending configurable data corresponding to the first location to the storage device, associating, with the sensing system, the storage device with a second location;
  in response to associating the storage device with the second location, sending configurable data corresponding to the second location to the storage device; and
  communicating with the storage device by a first network communication device corresponding to the first location;
  communicating with the storage device by a second network communication device corresponding to the second location;
  wherein the sensing system includes the first and second network communication devices, the step of associating, with the sensing system, the storage device with the first location is based on the first network communication device communicating with the storage device, and the step of associating, with the sensing system, the storage device with the second location is based on the second network communication device communicating with the storage device.

11. The method of claim 10, wherein the sensing system includes one or more GPS devices of the storage device and the step of associating, with the sensing system, the storage device with the first and second locations is based on the one or more GPS devices determining that the storage device is located at the first and second locations, respectively.

12. The method of claim 10, further comprising the step of:
  detecting the storage device at the first location, with a first sensing system of the sensing system that corresponds to the first location, the first sensing system comprising one or more of: an RFID sensor, a camera, a contact sensor, an electromagnetic sensor, or a weight sensor, wherein the step of associating, with the sensing system, the storage device with the first location is based on the first sensing system detecting the storage device at the first location; and
  receiving, with an access control device of the sensing system, information corresponding to a user of the storage device, wherein the step of associating, with the sensing system, the storage device with the second location is based on the access control device receiving information corresponding to the user of the storage device.

13. The method of claim 10, further comprising the step of:
  initiating an audit for the storage device after associating the storage device with the first location.

14. A non-transitory computer-readable medium storing executable instructions for carrying out a process comprising the steps of:
  monitoring presence of a plurality of objects in storage locations of a storage device;
  storing, to a data storage, configurable data of the storage device;
  receiving a first message from a sensing system associating the storage device with a first location;
  in response to receiving the first message, sending configurable data corresponding to the first location to the storage device;
  receiving a second message, after the first message, from the sensing system associating the storage device with a second location; and
  in response to receiving the second message, sending configurable data corresponding to the second location to the storage device, wherein the first and second message are generated respectively based on a first network communication device, corresponding to the first location, communicating with the storage device, and a second network communication device, corresponding to the second location, communicating with the storage device.

15. The medium of claim 14, wherein the first and second messages are generated based on one or more GPS devices of the sensing system, determining that the storage device is located at the first and second locations, respectively.

16. The medium of claim 14,
   wherein the first message is generated based on a first sensing system of the sensing system, detecting the storage device at the first location, the first sensing system comprising one or more of: an RFID sensor, a camera, a contact sensor, an electromagnetic sensor, or a weight sensor; and
   wherein the second message is generated based on an access control device of the sensing system receiving information corresponding to a user of the storage device.

17. The medium of claim 14, the process further comprising the step of:
   initiating an audit for the storage device after receiving the second message.

\* \* \* \* \*